(12) United States Patent
Kojima et al.

(10) Patent No.: US 11,181,149 B2
(45) Date of Patent: Nov. 23, 2021

(54) ROLLING BEARING

(71) Applicant: JTEKT CORPORATION, Osaka (JP)

(72) Inventors: Keisuke Kojima, Kashiba (JP);
Katsuyuki Harada, Yamatokoriyama (JP); Naoki Masuda, Kitakatsuragi-gun (JP); Hironori Hiraoka, Yao (JP)

(73) Assignee: Jtekt Corporation, Osaka (JP)

( * ) Notice: Subject to any disclaimer, the term of this patent is extended or adjusted under 35 U.S.C. 154(b) by 0 days.

(21) Appl. No.: 17/065,051

(22) Filed: Oct. 7, 2020

(65) Prior Publication Data

US 2021/0108681 A1 Apr. 15, 2021

(30) Foreign Application Priority Data

Oct. 11, 2019 (JP) .............................. JP2019-187516

(51) Int. Cl.
| | |
|---|---|
| *F16C 33/41* | (2006.01) |
| *F16C 33/38* | (2006.01) |
| *F16C 19/06* | (2006.01) |
| *F16C 33/66* | (2006.01) |
| *F16C 43/06* | (2006.01) |

(52) U.S. Cl.
CPC .......... *F16C 33/3887* (2013.01); *F16C 19/06* (2013.01); *F16C 33/3806* (2013.01); *F16C 33/418* (2013.01); *F16C 33/6614* (2013.01); *F16C 33/6651* (2013.01); *F16C 43/065* (2013.01)

(58) Field of Classification Search
CPC .. F16C 19/06; F16C 33/3806; F16C 33/3887; F16C 33/41; F16C 33/412; F16C 33/414; F16C 33/416; F16C 33/6614; F16C 33/6651; F16C 43/065
See application file for complete search history.

(56) References Cited

U.S. PATENT DOCUMENTS

| | | | | |
|---|---|---|---|---|
| 2,360,419 | A | * 10/1944 | Osgood | F16C 33/425 |
| | | | | 384/534 |
| 8,480,305 | B2 * | 7/2013 | Maeda | F16C 33/418 |
| | | | | 384/527 |
| 2011/0069920 | A1 * | 3/2011 | Aida | F16C 33/6674 |
| | | | | 384/572 |
| 2015/0211577 | A1 * | 7/2015 | Adane | F16C 33/467 |
| | | | | 384/527 |

FOREIGN PATENT DOCUMENTS

| | | | | | |
|---|---|---|---|---|---|
| JP | 2002147463 | A | * | 5/2002 | ............ F16C 33/418 |
| JP | 2007292117 | A | * | 11/2007 | .......... F16C 33/6681 |
| JP | 2009133483 | A | * | 6/2009 | .......... F16C 33/3806 |
| JP | 2010156366 | A | * | 7/2010 | ............ F16C 33/414 |
| JP | 2015-057558 | A | | 3/2015 | |

* cited by examiner

*Primary Examiner* — Phillip A Johnson
(74) *Attorney, Agent, or Firm* — Oliff PLC

(57) ABSTRACT

A rolling bearing includes an inner ring, an outer ring, a plurality of balls, and a cage that holds the balls. The cage includes an annular portion and a plurality of cage bars. Each of the balls is received a pocket between each pair of cage bars that is adjacent in the circumferential direction. A portion of the pocket in a second axial direction opens with a dimension that is smaller than a diameter of the balls. The cage bar includes a flat surface that is continuous with an inner peripheral surface of the annular portion, and an inclined surface that extends away from the inner ring toward the second axial direction from the flat surface.

3 Claims, 6 Drawing Sheets

ROLLING BEARING

CROSS-REFERENCE TO RELATED APPLICATION

This application claims priority to Japanese Patent Application No. 2019-187516 filed on Oct. 11, 2019, incorporated herein by reference in its entirety.

BACKGROUND

1. Technical Field

The present disclosure relates to a rolling bearing.

2. Description of Related Art

Rolling bearings are used in various devices. Among others, ball bearings in which rolling elements are balls are used for high-speed rotation. A ball bearing includes an inner ring, an outer ring, a plurality of balls, and an annular cage that holds the balls. In the case of a ball bearing (in particular, a deep-groove ball bearing), a cage of a so-called crown type and made of a resin is used from the viewpoint of assemblability. The crown-type cage has an annular portion and a plurality of cage bars provided to extend in the axial direction from the annular portion. Spaces formed between each pair of cage bars that is adjacent in the circumferential direction serve as pockets for receiving the balls. Japanese Unexamined Patent Application Publication No. 2015-57558 (JP 2015-57558 A) discloses a cage of a crown type.

SUMMARY

In the crown-type cage, the cage bars are held in a cantilever manner. Therefore, the cage bars are elastically deformed toward the outer ring by a centrifugal force when the rolling bearing is rotated. When the rotational speed becomes higher and the cage bars are deformed more significantly, a part of the cage may strongly contact the balls or the outer ring. In this case, wear of the cage may be promoted to break the cage.

In order to reduce a centrifugal force that deforms the cage, the weight of the cage bar may be reduced. To that end, as illustrated in FIG. 6, for example, it is proposed to form a radially inside surface 94 of a cage bar 90 as an inclined surface.

A rolling bearing that includes a crown-type cage 96 is assembled as follows. A plurality of balls 97 is disposed between an inner ring 99 and an outer ring 98. Next, the cage 96 is assembled to the balls 97. In the crown-type cage 96, pockets 93 that receive the balls 97 open on the second axial side (left side in FIG. 6) with a dimension that is smaller than the diameter of the balls 97.

Therefore, in order to assemble the cage 96, the cage 96 is moved closer to the balls 97 from the first axial side toward the second axial side, and a portion (opening 95) of the pockets 93 on the second axial side is caused to contact a part of hemispheres 97a of the balls 97 on the first axial side. FIG. 6 is a sectional view illustrating the assembly of the cage 96 according to the related art, illustrating a state in which a portion of the pocket 93 on the second axial side contacts a part of the hemisphere 97a of the ball 97 on the first axial side. This state is referred to as an "unassembled state".

The cage 96 in the unassembled state is pressed toward the second axial side. Consequently, the balls 97 are received in the pockets 93 through the opening 95 with a part of the cage bars 90 elastically deformed. To press the cage 96 in the unassembled state, it is necessary to apply a large force in the axial direction to the cage 96.

If the inner ring 99 and the cage 96 are eccentric when the cage 96 in the unassembled state illustrated in FIG. 6 is pressed toward the second axial side, a part of the radially inside surface 94 of the cage bar 90 may contact (be caught on) a part of a shoulder portion 99a of the inner ring 99. If a large force in the axial direction is applied to the cage 96 in this state to forcibly press the cage 96 toward the second axial side, a part of the radially inside surface 94 of the cage bar 90 may strongly contact a part of the shoulder portion 99a of the inner ring 99 to damage the radially inside surface 94.

Thus, the present disclosure reduces a centrifugal force that causes deformation of a cage by reducing the weight of cage bars, and suppresses damage to the radially inside surface of the cage bars due to a part of the radially inside surface strongly contacting a part of the outer peripheral portion of an inner ring.

An aspect of the present disclosure provides a rolling bearing. The rolling bearing includes an inner ring, an outer ring, a plurality of balls provided between the inner ring and the outer ring, and a cage that holds the balls at intervals in a circumferential direction. The cage includes an annular portion provided in a first axial direction with respect to the balls, and a plurality of cage bars provided to extend in a second axial direction from the annular portion. Each of the balls is received a pocket between each pair of cage bars that is adjacent in the circumferential direction. A portion of the pocket in the second axial direction opening with a dimension that is smaller than a diameter of the balls. The cage bar faces, in a radial direction, a shoulder portion of the inner ring in a first axial direction in an unassembled state in which the portion of the pocket in the second axial direction contacts a part of a hemispherical surface of the ball in the first axial direction. The cage bar includes a flat surface that is continuous with an inner peripheral surface of the annular portion, and an inclined surface that extends away from the inner ring toward the second axial direction from the flat surface.

With the configuration described above, the weight of the cage bar can be reduced because of the presence of the inclined surface. Therefore, it is possible to reduce a centrifugal force that deforms the cage (cage bar). A portion of the pockets in the second axial direction opens with a dimension that is smaller than the diameter of the balls. Therefore, when assembling the cage, the balls are received in the pockets through the opening by moving the cage closer to the balls from the first axial direction and pressing the cage. In this event, a part of the cage bar is elastically deformed such that the balls widen the opening. During the assembly, a part (inclined surface) of the radially inside surface of the cage bar may be caught on a part of the outer peripheral portion of the inner ring. If the cage is pressed forcibly, the part of the radially inside surface of the cage bar may strongly contact the part of the outer peripheral portion of the inner ring to damage the radially inside surface of the cage bar.

In the configuration described above, however, the flat surface of the cage bar faces, in the radial direction, the shoulder portion of the inner ring in the first axial direction in the unassembled state, and is continuous with the inner peripheral surface of the annular portion. Therefore, the assembly of the cage is completed, without the inclined surface of the cage contacting the shoulder portion of the inner ring in the first axial direction, by linearly pressing the cage in the unassembled state toward the second axial direction. Hence, a part of the radially inside surface of the cage bar does not strongly contact a part of the outer peripheral portion of the inner ring, and it is possible to suppress damage to the radially inside surface.

In the rolling bearing, the annular portion may include a contact surface that makes sliding contact with the shoulder portion of the inner ring in the first axial direction. With the configuration described above, the rolling bearing is an inner ring-guided bearing in which rotation of the cage is guided by the inner ring. In the case of an inner ring-guided bearing, the cage and the inner ring are disposed in proximity to each other. Therefore, a part of the radially inside surface of the cage tends to contact the inner ring during assembly of the cage, which is highly likely to damage the radially inside surface of the cage bar. With the flat surface, however, the cage is assembled without a part of the radially inside surface of the cage bar strongly contacting a part of the outer peripheral portion of the inner ring after the unassembled state. That is, even the inner ring-guided cage can be assembled smoothly.

In the rolling bearing, the contact surface may be provided with a recessed portion. With the configuration described above, a lubricant between the annular portion and the shoulder portion of the inner ring in the first axial direction is accumulated in the recessed portion. Hence, the lubrication between the annular portion and the shoulder portion is improved.

With the rolling bearing according to the present disclosure, it is possible to reduce a centrifugal force that deforms the cage by reducing the weight of the cage bar. In addition, a part of the radially inside surface of the cage bar does not strongly contact a part of the outer peripheral portion of the inner ring, and it is possible to suppress damage to the radially inside surface.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Overall Configuration of Rolling Bearing

Figure 1:
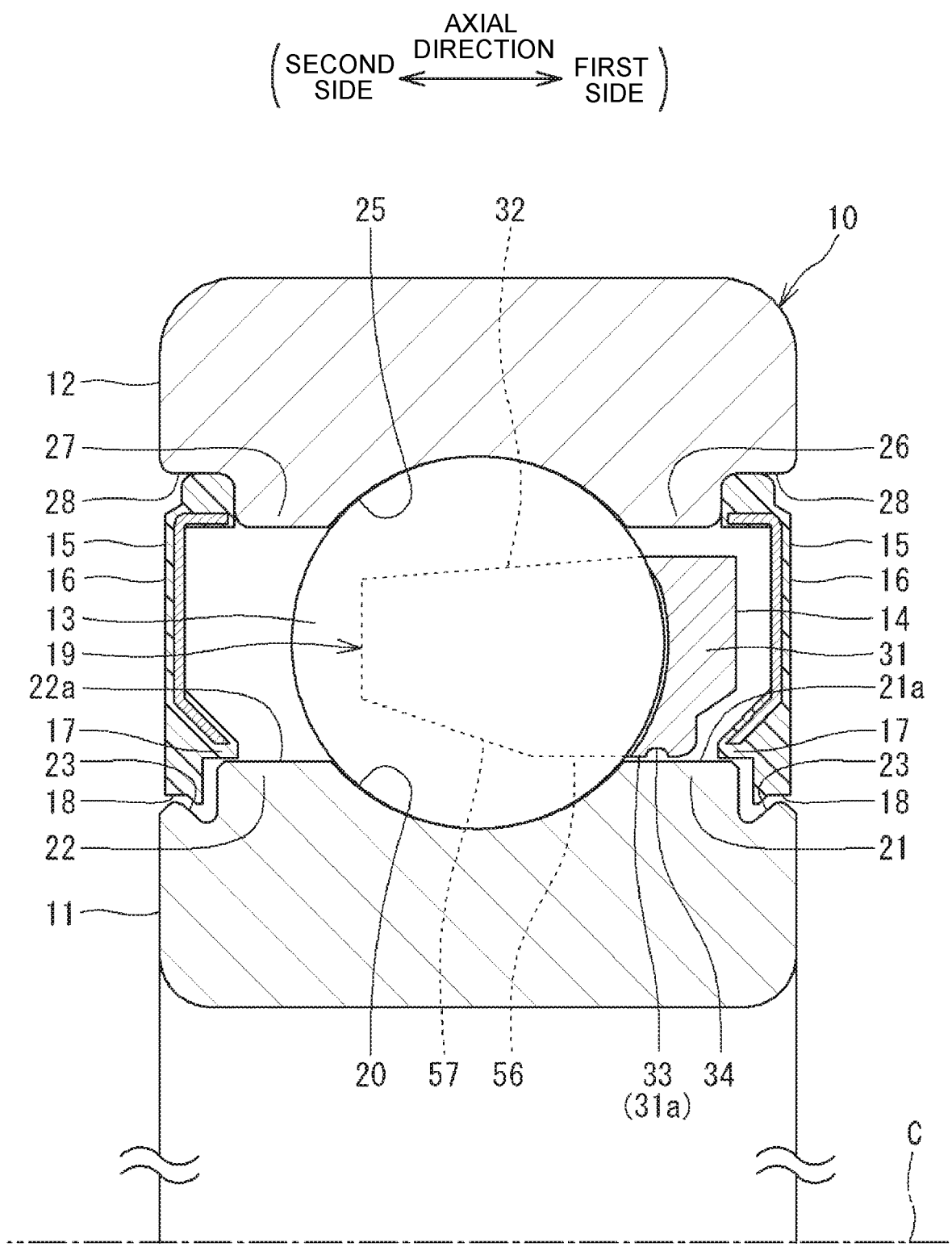
FIG. 1 is a sectional view illustrating an example of a rolling bearing.

FIG. 1 is a sectional view illustrating an example of a rolling bearing. A rolling bearing 10 illustrated in FIG. 1 includes an inner ring 11, an outer ring 12 provided on the radially outer side of the inner ring 11, a plurality of balls 13 provided between the inner ring 11 and the outer ring 12, and an annular cage 14 that holds the balls 13 at intervals in the circumferential direction. The rolling bearing 10 is a ball bearing. In particular, the rolling bearing 10 illustrated in FIG. 1 is a deep-groove ball bearing.

In the present disclosure, the direction along a center line C (hereinafter referred to as a "bearing center line C") of the rolling bearing 10 corresponds to the axial direction of the rolling bearing 10, and is simply referred to as an "axial direction". The axial direction includes a direction that is parallel to the bearing center line C. The right side in FIG. 1 is defined as a first axial side. The left side in FIG. 1 is defined as a second axial side. The direction which is orthogonal to the bearing center line C corresponds to the radial direction of the rolling bearing 10, and is simply referred to as a "radial direction". The direction in which the rolling bearing 10 (in the present disclosure, the inner ring 11) is rotated about the bearing center line C corresponds to the circumferential direction of the rolling bearing 10, and is simply referred to as a "circumferential direction".

The rolling bearing 10 further includes sealing devices 15 on both sides in the axial direction. An annular space formed between the inner ring 11 and the outer ring 12 is the space inside the bearing in which the balls 13 and the cage 14 are provided. The sealing devices 15 suppress leakage of a lubricant inside the bearing (annular space) to the outside of the bearing. The sealing devices 15 also have a function of suppressing entry of foreign matter outside the bearing into the bearing.

The lubricant which is used in the rolling bearing 10 according to the present disclosure is grease. In particular, channeling grease is used. The channeling grease is pushed out of the way when the balls 13 pass raceways (20, 25) in the inner ring 11 and the outer ring 12, and does not easily return to the raceways (20, 25). The grease stays in a vacant space inside the bearing and adheres to the surface of the cage 14 etc., and base oil contained in the grease flows out to contribute to lubrication. Churning grease with relatively high flowability may also be used as the lubricant, rather than the channeling grease, or oil may also be used.

The inner ring 11 is an annular member. An inner ring raceway 20 in which the balls 13 roll is formed in the outer periphery of the inner ring 11. The inner ring raceway 20 has a concave arcuate sectional shape, the radius of which is slightly larger than that of the balls 13, in a section including the bearing center line C. The inner ring 11 has a shoulder portion 21 (first shoulder portion 21) on the first axial side of the inner ring raceway 20, and a shoulder portion 22 (second shoulder portion 22) on the second axial side of the inner ring raceway 20.

An outer peripheral surface 21a of the first shoulder portion 21 and an outer peripheral surface 22a of the second shoulder portion 22 each have a cylindrical surface shape centered on the bearing center line C. The outer peripheral surfaces 21a, 22a are each a polished surface. An inside peripheral groove 23 is formed in the outer periphery of the inner ring 11 on both side portions in the axial direction.

The outer ring 12 is an annular member. An outer ring raceway 25 in which the balls 13 roll is formed in the inner periphery of the outer ring 12. The outer ring raceway 25 has a concave arcuate sectional shape, the radius of which is slightly larger than that of the balls 13, in a section including the bearing center line C. The outer ring 12 has a shoulder portion 26 on the first axial side of the outer ring raceway 25, and a shoulder portion 27 on the second axial side of the outer ring raceway 25. An outside peripheral groove 28 is formed in the inner periphery of the outer ring 12 on both side portions in the axial direction.

Figure 2:
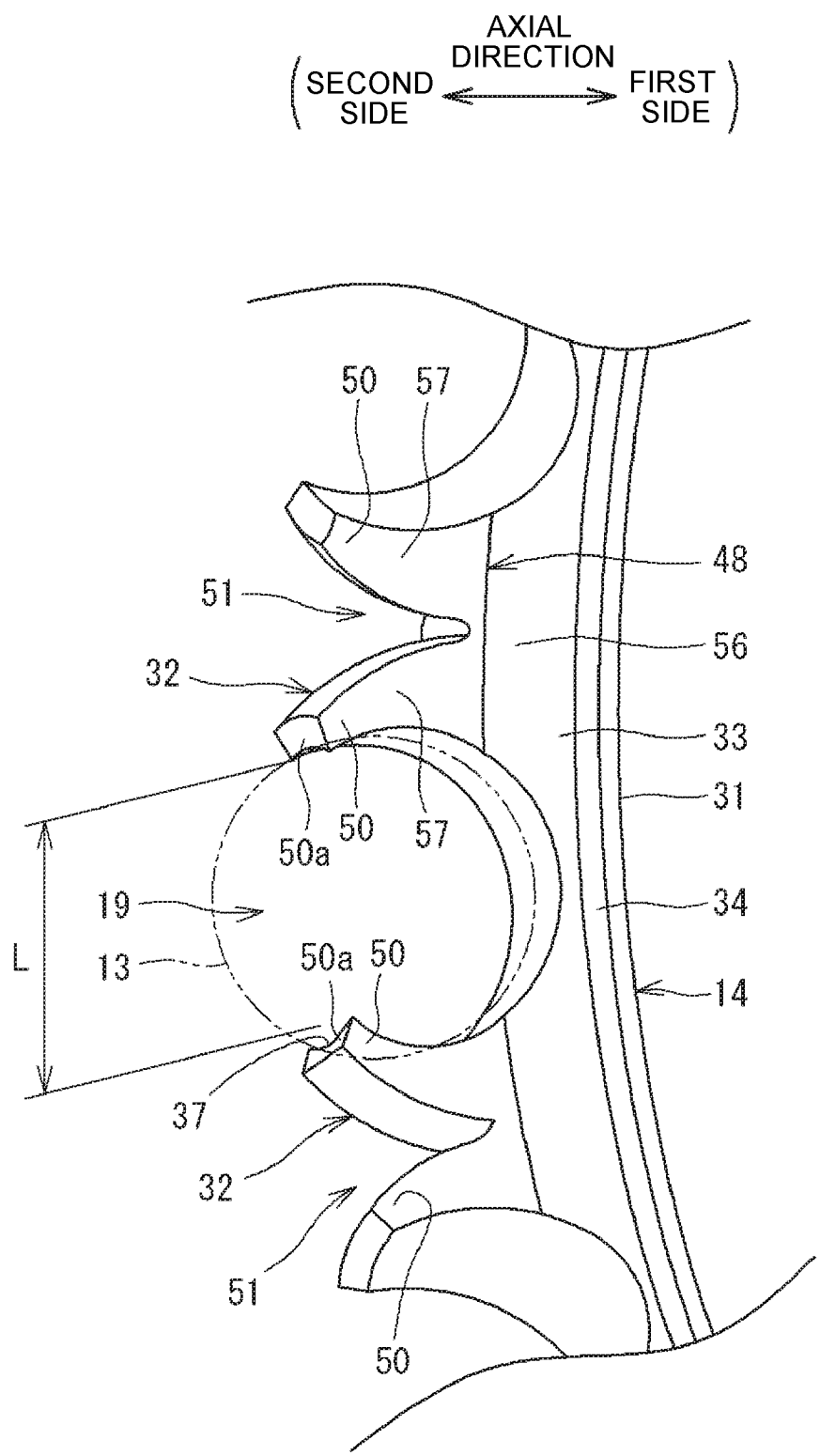
FIG. 2 illustrates a part of a cage as seen from the radially inner side.

The cage 14 is made of a resin (synthetic resin). The cage 14 has an annular portion 31 provided on the first axial side with respect to the balls 13, and a plurality of cage bars 32 provided to extend toward the second axial side from the annular portion 31. FIG. 2 illustrates a part of the cage 14 as seen from the radially inner side. In FIGS. 1 and 2, pockets 19 for receiving the balls 13 are formed on the second axial side of the annular portion 31 between each pair of cage bars 32, 32 that is adjacent in the circumferential direction. The pockets 19 open on the second axial side (opening 37) with a dimension that is smaller than the diameter of the balls 13. The cage 14 according to the present disclosure is of a so-called crown type.

In FIG. 1, the sealing devices 15 on the first axial side and the second axial side have the same configuration, but are attached in opposite directions. The sealing devices 15 each have a circular ring portion 16 in a circular ring shape, a projecting portion 18 provided at the inner peripheral end portion of the circular ring portion 16, and a lip portion 17 provided continuously with the projecting portion 18 to project toward the balls 13. The outer peripheral end portion of the circular ring portion 16 is attached to the outside peripheral groove 28.

Figure 3:
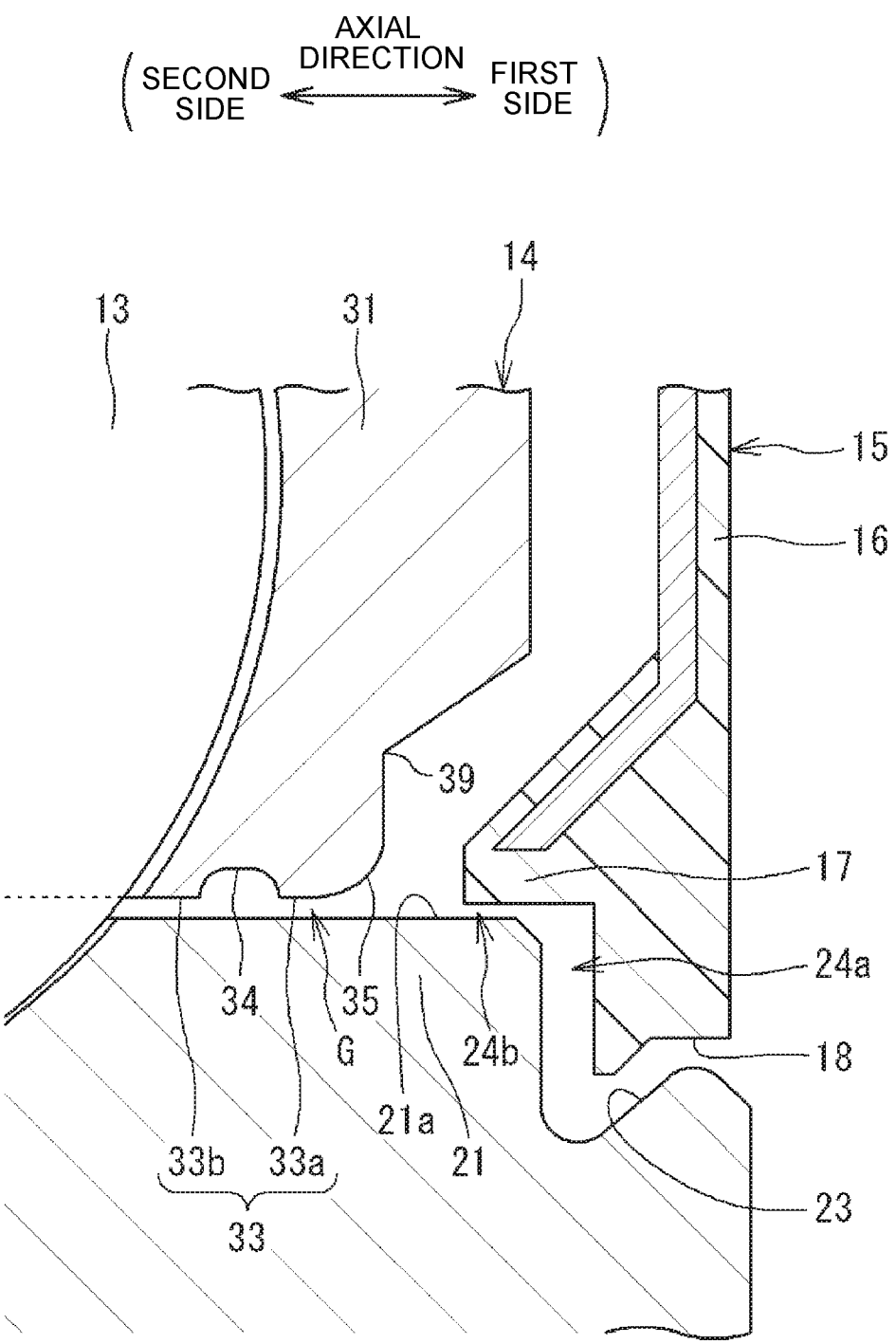
FIG. 3 is an enlarged sectional view illustrating a part, on the inner peripheral side, of a sealing device on the first axial side and a part of the cage on the inner peripheral side.

FIG. 3 is an enlarged sectional view illustrating a part, on the inner peripheral side, of the sealing device 15 on the first axial side and a part of the cage 14 on the inner peripheral side. The projecting portion 18 is provided to face the inside peripheral groove 23 with a gap 24a therebetween. The lip portion 17 is provided to face the shoulder portion 21 with a radial gap 24b therebetween. The gaps 24a and 24b are minute gaps, and constitute a labyrinth gap. In order to form the gap 24b as a minute gap, in particular, the outer peripheral surface 21a of the shoulder portion 21 has been polished to form a polished surface.

Configuration of Cage 14

The configuration of the cage 14 will be further described. In FIGS. 1 and 2, the annular portion 31 is in a circular ring shape. The annular portion 31 has, on the inner peripheral side thereof, a contact surface 33 that makes sliding contact with the first shoulder portion 21. The contact surface 33 has a cylindrical surface shape centered on the bearing center line C. As illustrated in FIG. 3, the contact surface 33 is proximate to the outer peripheral surface 21a of the shoulder portion 21 in the radial direction, with a minute gap G formed therebetween. The cage 14 is slightly movable in the radial direction. Rotation of the cage 14 is guided by the inner ring 11 with the contact surface 33 making sliding contact with the outer peripheral surface 21a of the shoulder portion 21. That is, the rolling bearing 10 according to the present disclosure has an inner ring-guided cage 14.

The contact surface 33 is provided with a recessed portion 34. The recessed portion 34 according to the present disclosure is constituted of a recessed groove that is continuous in the circumferential direction. A surface 33a on the first axial side with respect to the recessed portion 34 and a surface 33b on the second axial side with respect to the recessed portion 34, of the contact surface 33, can contact the outer peripheral surface 21a of the shoulder portion 21 (see FIG. 3).

In FIG. 3, the annular portion 31 has an undercut surface 35 on the inner peripheral side thereof, besides the contact surface 33. The contact surface 33 can contact the outer peripheral surface 21a of the shoulder portion 21, with the gap G formed between the outer peripheral surface 21a of the shoulder portion 21 and the contact surface 33 being uniform along the axial direction. The undercut surface 35 is provided continuously on the first axial side of the contact surface 33, and extends away from the outer peripheral surface 21a of the shoulder portion 21 toward the first axial side. In the present disclosure, the undercut surface 35 is configured to have a round convex sectional shape (curved surface). The undercut surface 35 may be configured to have a linearly inclined sectional shape.

A cutaway portion 39 is provided on the inner peripheral side of the annular portion 31 and on the first axial side. The cutaway portion 39 suppresses interference between the cage 14 and the lip portion 17 of the sealing device 15.

Figure 4:
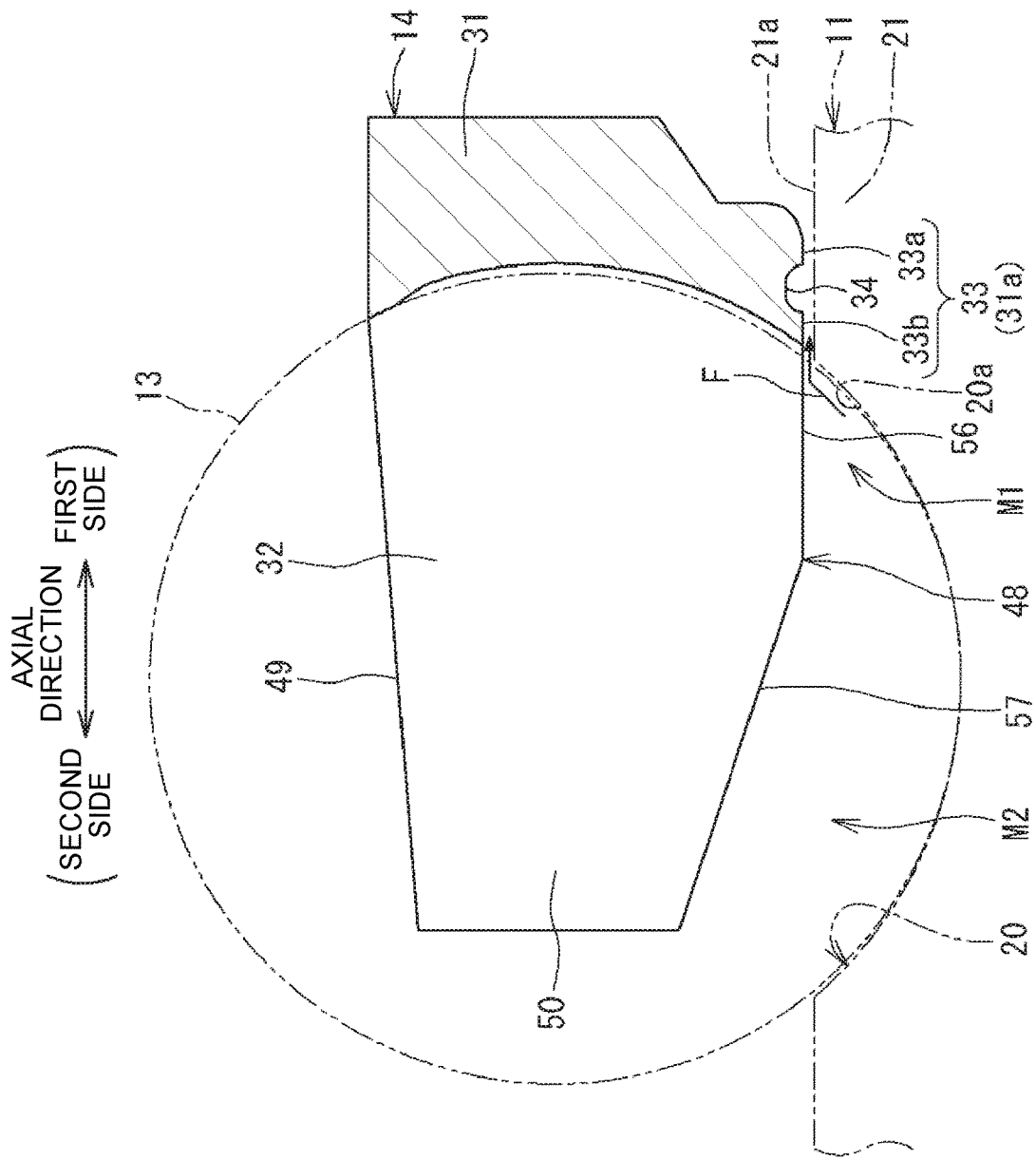
FIG. 4 is a sectional view of the cage.

FIG. 4 is a sectional view of the cage 14. The cage bar 32 will be described. A radially inside surface 48 of the cage bar 32 is shaped to be close to the inner ring 11 on the side of the base portion (side of the annular portion 31), which is the first axial side, and to be away from the inner ring 11 on the side of the distal end, which is the second axial side. Specifically, the radially inside surface 48 of the cage bar 32 has a flat surface 56 and an inclined surface 57. The flat surface 56 is continuous with an inner peripheral surface 31a (contact surface 33) of the annular portion 31. The flat surface 56 and the contact surface 33 are shaped along a common cylindrical surface centered on the bearing center line C. The inclined surface 57 has an inclined shape to extend away from the inner ring 11 toward the second axial side from the flat surface 56.

The flat surface 56 is extended from a part of the inner peripheral surface 31a (contact surface 33) of the annular portion 31 toward the second axial side. The flat surface 56 covers only the part 20a of the inner ring raceway 20 on the side of the first shoulder portion 21 from the radially outer side. The flat surface 56 of the cage bar 32 covers only the part 20a of the inner ring raceway 20 on the first axial side from the radially outer side. A space M1 between the part 20a and the flat surface 56 is relatively small. On the contrary, a large space M2 is formed between the remaining, large portion of the inner ring raceway 20 excluding the part 20a and the inclined surface 57. The large space M2 suppresses a splash of the grease in the inner ring raceway 20 during rotation of the rolling bearing 10.

The flat surface 56 functions effectively also during assembly of the rolling bearing 10. That is, as described again later, the flat surface 56 has a function of facilitating assembly of the cage 14 to the balls 13, which are interposed between the inner ring 11 and the outer ring 12, and suppressing damage to the radially inside surface 48 of the cage bar 32.

When the rolling bearing 10 is rotated, a centrifugal force acts on the cage 14. The cage 14 is made of a resin, and is of a crown type. In the crown-type cage 14, the cage bars 32 are held in a cantilever manner. Therefore, the cage bars 32 are elastically deformed toward the outer ring 12 by a centrifugal force when the rolling bearing 10 is rotated. The cage bars 32 are deformed more significantly as the rotational speed becomes higher. Thus, the cage 14 according to the present disclosure is configured to reduce the weight of the cage bars 32, in order to reduce generation of a centrifugal force due to the rotation and suppress deformation of the cage 14. The configuration for the weight reduction will be described below.

As described above, the radially inside surface 48 of the cage bar 32 has the inclined surface 57. Because of the inclined surface 57, the cage bar 32 is shaped to be tapered toward the second axial side. This configuration contributes to the weight reduction of the cage bar 32.

In order to reduce the weight of the cage bar 32, a radially outside surface 49 of the cage bar 32 is an inclined surface inclined toward the inner ring 11 as the surface extends from the first axial side toward the second axial side. This configuration makes it difficult for the cage bar 32 to contact the outer ring 12 even if the cage bar 32 is elastically deformed toward the outer ring 12 by a centrifugal force.

As illustrated in FIG. 2, the cage bar 32 has a pair of lug portions 50, 50 provided to extend toward the second axial side. An unfilled portion 51 in a V sectional shape is provided between the pair of lug portions 50, 50 of each cage bar 32. The unfilled portion 51 is deeply cut in the axial direction, reducing the weight of the cage bar 32.

The weight of the cage bar 32 is reduced in the manner described above, reducing the generated centrifugal force. In the present disclosure, further, the axial dimension of the annular portion 31 is increased in order to make it difficult for the cage 14 to be deformed by a centrifugal force by enhancing the rigidity of the cage 14.

In FIG. 2, a space between respective distal ends 50a, 50a of the two lug portions 50, 50 which face each other with a pocket 19 interposed therebetween serves as an opening 37 of the pocket 19. A maximum dimension L of the opening 37 is smaller than the diameter of the ball 13. The distal ends 50a, 50a of the lug portions 50, 50 suppress slipping of the cage 14 from the ball 13. To assemble the rolling bearing 10, as described again later (see FIG. 5), the cage 14 is moved closer to the plurality of balls 13, which is interposed between the inner ring 11 and the outer ring 12, from the first axial side, and a portion (opening 37) of the pocket 19 on the second axial side is caused to contact a part of the hemispherical surface 53 of the ball 13 on the first axial side. The cage 14 is further pressed from that state toward the second axial side. In this event, the lug portions 50, 50 are pressed by the balls 13 to be elastically deformed, widening the opening 37, and the cage 14 is assembled to the balls 13.

Assembly of Cage 14

Figure 5:
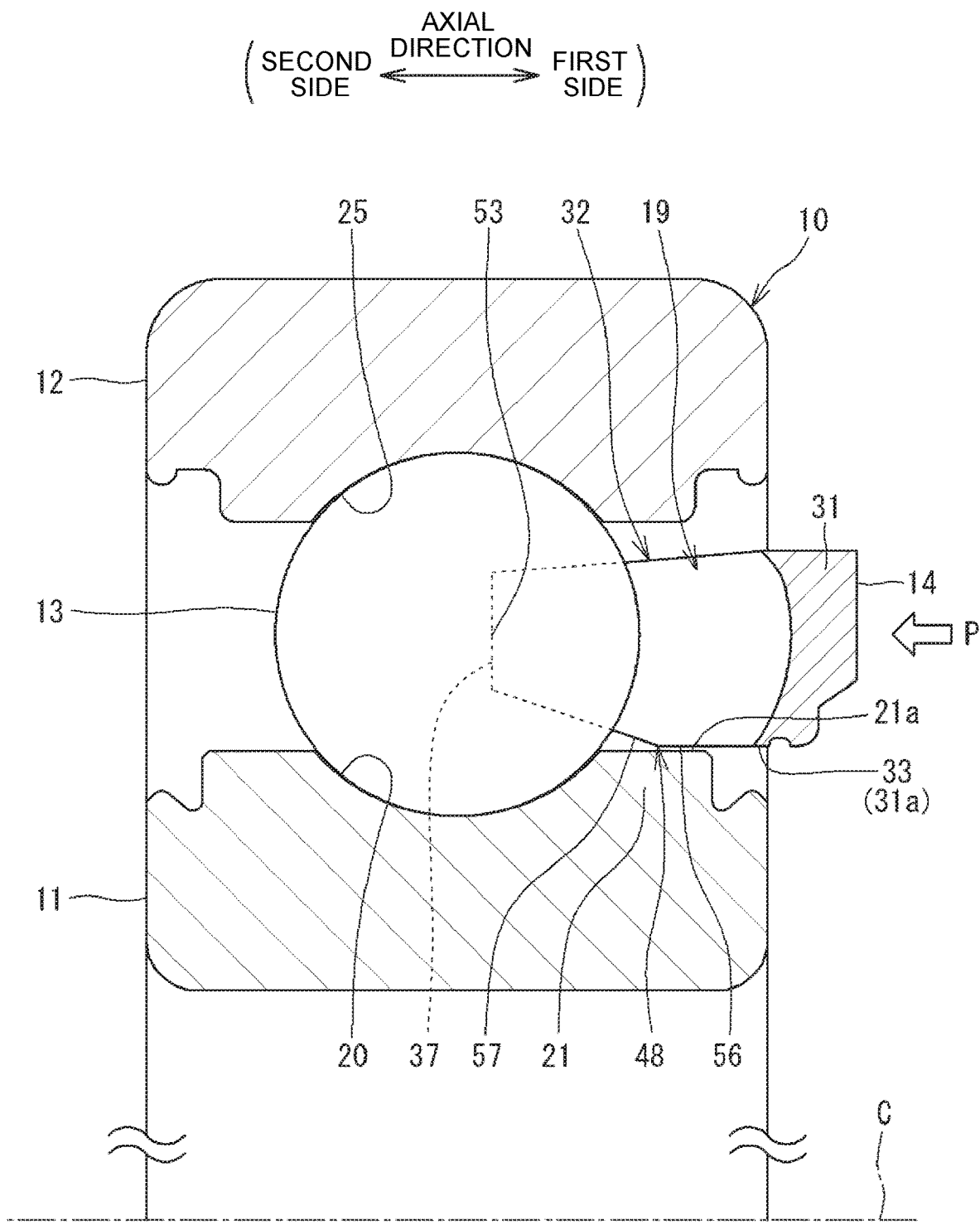
FIG. 5 illustrates a state in which a portion of a pocket on the second axial side contacts a part of a hemispherical surface of a ball on the first axial side in the cage.

The rolling bearing 10 configured as described above is assembled as follows. First, a plurality of balls 13 is disposed between the inner ring 11 and the outer ring 12. Next, as illustrated in FIG. 5, a cage 14 is assembled to the balls 13. FIG. 5 illustrates a state in which a portion of the pocket 19 of the cage 14 on the second axial side contacts a part of the hemispherical surface 53 of the ball 13 on the first axial side. This state is a state before the balls 13 are received in the pockets 19, and corresponds to the "unassembled state". In the case where the bearing center line C extends along the plumb line and the cage 14 is moved closer to the balls 13, which are provided between the inner ring 11 and the outer ring 12, from the upper side toward the lower side and pressed downward to be assembled, a state in which the cage 14 is placed on the balls 13 corresponds to the unassembled state.

In the crown-type cage 14, as described above, the pockets 19 which receive the balls 13 open on the second axial side with a dimension that is smaller than the diameter of the balls 13 (see FIG. 2). Therefore, the cage 14 is assembled by moving the cage 14 closer to the balls 13 from the first axial side, and establishing an unassembled state in which a portion (opening 37) of the pockets 19 on the second axial side contacts a part of the hemispherical surfaces 53 of the balls 13 on the first axial side. The cage 14 in the unassembled state is pressed toward the second axial side. The direction in which the cage 14 is moved closer to the balls 13 from the first axial side and pressed is indicated by an arrow P in FIG. 5. Consequently, the balls 13 are received in the pockets 19 through the opening 37 with the balls 13 elastically deforming a part of the cage bars 32 so as to widen the opening 37. As a result, the cage 14 is provided at a predetermined position between the inner ring 11 and the outer ring 12. To press the cage 14 in the unassembled state, it is necessary to apply a large force in the axial direction to the cage 14.

Figure 6:
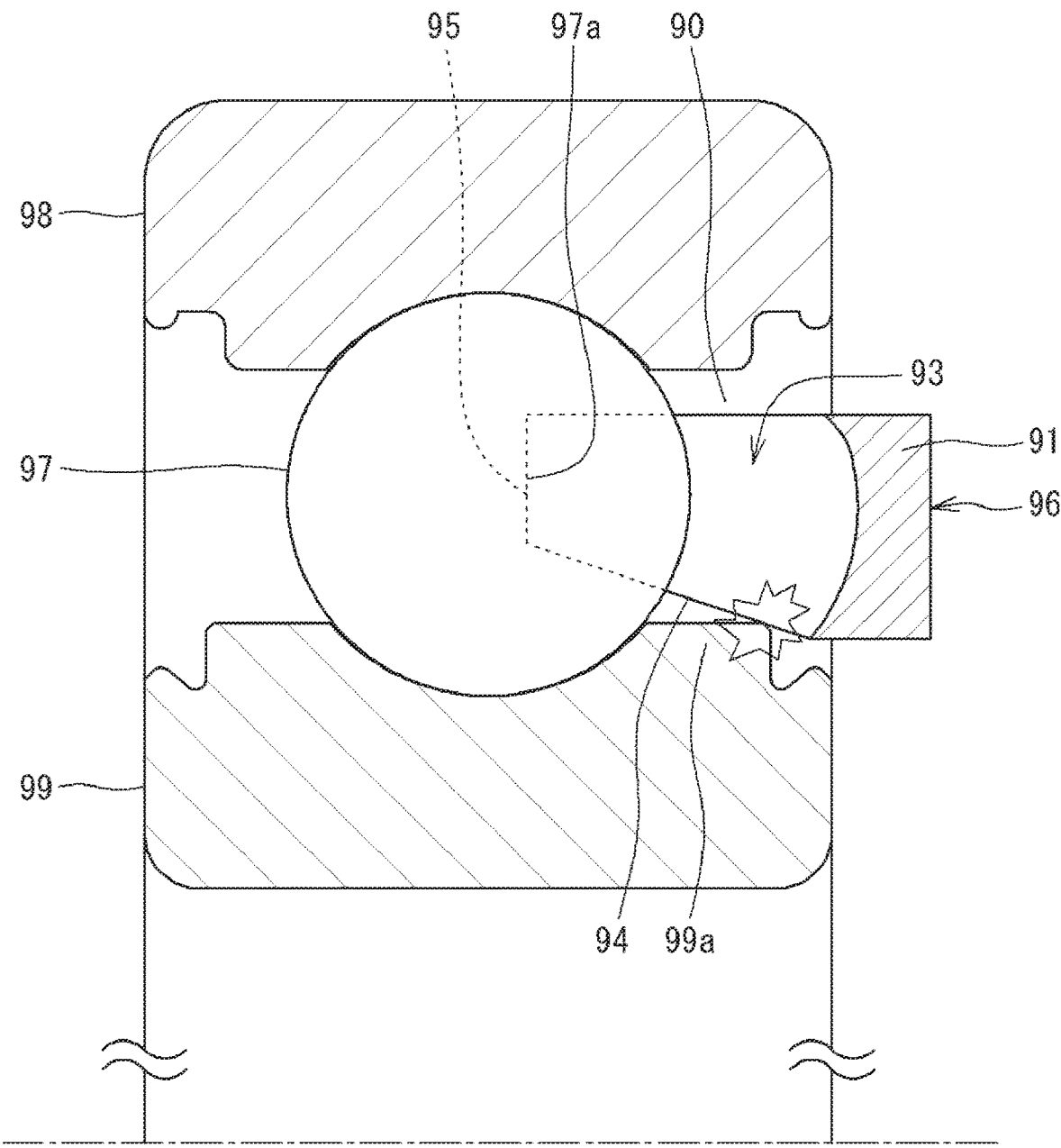
FIG. 6 is a sectional view illustrating assembly of a cage according to the related art.

When assembling the cage to the plurality of balls as described above in the related art, as illustrated in FIG. 6, a part of the radially inside surface 94 of the cage bar 90 may be caught on the shoulder portion 99a of the inner ring 99. If the cage 96 is pressed forcibly, a part of the radially inside surface 94 of the cage bar 90 may strongly contact the shoulder portion 99a to damage the radially inside surface 94.

On the contrary, with the rolling bearing 10 according to the present disclosure, as illustrated in FIG. 5, the flat surface 56 of the radially inside surface 48 of the cage bar 32 suppresses the damage described above, and facilitates assembly of the cage 14. That is, as illustrated in FIG. 5, the flat surface 56 faces the outer peripheral surface 21a of the first shoulder portion 21 of the inner ring 11 in the radial direction in an unassembled state in which a portion (opening 37) of the pocket 19 on the second axial side contacts a part of the hemispherical surface 53 of the ball 13 on the first axial side. The flat surface 56 is continuous with the inner peripheral surface 31a (contact surface 33) of the annular portion 31. In the unassembled state illustrated in FIG. 5, the flat surface 56 faces a portion of the outer peripheral surface 21a of the first shoulder portion 21 formed as a cylindrical surface in the range of 1 millimeter or more in the axial direction.

Therefore, the assembly of the cage 14 is completed by linearly pressing the cage 14 in the unassembled state toward the second axial side. Hence, a part of the radially inside surface 48 of the cage bar 32 does not strongly contact the first shoulder portion 21 of the inner ring 11, and it is possible to suppress damage to the radially inside surface 48.

In addition, the radially inside surface 48 of the cage bar 32 has the inclined surface 57 which is continuous with the flat surface 56. Therefore, when assembling the cage 14 by moving the cage 14 closer to the balls 13 which are interposed between the inner ring 11 and the outer ring 12, the inclined surface 57 can contact the first shoulder portion 21, which is a part of the outer peripheral portion of the inner ring 11, to align the cage 14 with respect to the inner ring 11. That is, in the case where the bearing center line C extends along the plumb line and when the cage 14 is moved downward from above closer to the balls 13 which are interposed between the inner ring 11 and the outer ring 12, the cage 14 is aligned with respect to the inner ring 11 by the inclined surface 57 to establish an unassembled state (see FIG. 5) in which the cage 14 is placed on the balls 13. In the unassembled state, the flat surface 56 faces the first shoulder portion 21 in the radial direction.

It is not necessary to strongly push the cage 14 toward the second axial side from a state in which the cage 14 (second axial side of the pocket 19; opening 37) is not in contact with the balls 13 before the unassembled state is established. Therefore, even if the inclined surface 57 contacts the first shoulder portion 21, the inclined surface 57 makes sliding contact with the first shoulder portion 21, and is not damaged.

Rolling Bearing 10 According to Present Disclosure

In the rolling bearing 10 according to the present disclosure, as described above, the pockets 19 of the cage 14 open on the second axial side with a dimension that is smaller than the diameter of the balls 13 (see FIG. 2). As illustrated in FIG. 5, the cage bar 32 of the cage 14 has, on the radially inner side thereof, the flat surface 56 and the inclined surface 57. The inclined surface 57 is shaped to extend away from the inner ring 11 toward the second axial side from the flat surface 56. Therefore, it is possible to reduce the weight of the cage bar 32, and to reduce a centrifugal force that deforms the cage 14 (cage bar 32). As a result, deformation of the cage 14 is suppressed.

The flat surface 56 faces the outer peripheral surface 21a of the first shoulder portion 21 in the radial direction in the unassembled state illustrated in FIG. 5, and is continuous with the inner peripheral surface 31a (contact surface 33) of the annular portion 31. Therefore, when assembling the cage 14 to the balls 13 which are provided between the inner ring 11 and the outer ring 12, the assembly of the cage 14 is completed by linearly pressing the cage 14 in the unassembled state toward the second axial side. Hence, a part of the radially inside surface 48 of the cage bar 32 does not strongly contact the first shoulder portion 21, and it is possible to suppress damage to the radially inside surface 48.

In the rolling bearing 10 according to the present disclosure, the annular portion 31 of the cage 14 has the contact surface 33 which makes sliding contact with the first shoulder portion 21. Therefore, the rolling bearing 10 according to the present disclosure is an inner ring-guided bearing in which rotation of the cage 14 is guided by the inner ring 11. In the case of an inner ring-guided bearing, the cage 14 and the inner ring 11 are disposed in proximity to each other. Therefore, a part of the radially inside surface 48 of the cage 14 tends to contact the inner ring 11 during assembly of the cage 14, which is highly likely to damage the radially inside surface 48 of the cage bar 32. With the flat surface 56, however, the cage 14 is assembled without a part of the radially inside surface 48 of the cage bar 32 being caught on the first shoulder portion 21 after the unassembled state. That is, even the inner ring-guided cage 14 can be assembled smoothly.

In the rolling bearing 10 according to the present disclosure, in addition, the flat surface 56 of the cage bar 32 covers the part 20a of the inner ring raceway 20 on the side of the first shoulder portion 21 in the assembled state illustrated in FIG. 4. Therefore, when grease that is present in the part 20a of the inner ring raceway 20 is moved radially outward by a centrifugal force as indicated by an arrow F in FIG. 4, the grease can contact the flat surface 56, and flow toward the contact surface 33 along the flat surface 56. Therefore, the grease is easily supplied to a location between the annular portion 31 and the first shoulder portion 21. Hence, the lubrication between the annular portion 31 and the first shoulder portion 21 is improved.

Further, the contact surface 33 of the annular portion 31 is provided with the recessed portion 34. The lubricant between the annular portion 31 and the first shoulder portion 21 is accumulated in the recessed portion 34. Hence, the lubrication between the annular portion 31 and the first shoulder portion 21 is improved. As a result, it is possible to suppress wear due to the cage 14 making sliding contact with the inner ring 11 even in the case where the rolling bearing 10 is used in a high-speed rotation environment.

Others

While the rolling bearing 10 is a deep-groove ball bearing in the present disclosure, the rolling bearing 10 may be in a different form, and may be an angular ball bearing, for example.

The embodiment disclosed above is exemplary in all respects, and not limiting. The scope of the present disclosure is not limited to the embodiment discussed above, and includes all modifications that fall within the scope of equivalence to the configuration described in the claims.

What is claimed is:

1. A rolling bearing comprising:
   an inner ring;
   an outer ring;
   a plurality of balls between the inner ring and the outer ring; and
   a cage that holds the balls at intervals in a circumferential direction, wherein:
   the cage includes an annular portion in a first axial direction with respect to the balls, and a plurality of cage bars extending in a second axial direction from the annular portion;
   each of the balls is in a pocket between each pair of cage bars that is adjacent in the circumferential direction, a portion of the pocket in the second axial direction opening with a dimension that is smaller than a diameter of the balls;
   the cage bars include a flat surface that is continuous with an inner peripheral surface of the annular portion, and an inclined surface that extends away from the inner ring toward the second axial direction from the flat surface; and
   the flat surface extends such that the flat surface is radially aligned with a shoulder portion of the inner ring in the first axial direction during an unassembled state in which the portion of the pocket in the second axial direction contacts a part of a hemispherical surface of the ball in the first axial direction, wherein the shoulder portion is a radially outer-most surface of the inner ring between the ball and the annular portion in the unassembled state.

2. The rolling bearing according to claim 1, wherein the annular portion includes a contact surface that makes sliding contact with the shoulder portion of the inner ring in the first axial direction.

3. The rolling bearing according to claim 2, wherein the contact surface includes a recessed portion.

* * * * *